United States Patent
Miyake et al.

(10) Patent No.: US 11,801,895 B2
(45) Date of Patent: Oct. 31, 2023

(54) CONTROL DEVICE AND CONTROL METHOD FOR ELECTRIC POWER STEERING APPARATUS, AND MOTOR MODULE

(71) Applicant: NIDEC CORPORATION, Kyoto (JP)

(72) Inventors: Sohei Miyake, Kyoto (JP); Jun Ogawa, Kyoto (JP); Satoru Onishi, Kyoto (JP); Masaya Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 174 days.

(21) Appl. No.: 17/367,635

(22) Filed: Jul. 6, 2021

(65) Prior Publication Data

US 2022/0017144 A1    Jan. 20, 2022

(30) Foreign Application Priority Data

Jul. 16, 2020   (JP) ................. 2020-121934

(51) Int. Cl.
*B62D 15/02* (2006.01)
*B62D 6/00* (2006.01)
*B62D 5/04* (2006.01)

(52) U.S. Cl.
CPC ......... *B62D 15/0245* (2013.01); *B62D 5/049* (2013.01); *B62D 6/00* (2013.01); *B62D 15/0215* (2013.01)

(58) Field of Classification Search
CPC ................................................ G06V 20/588
See application file for complete search history.

(56) References Cited

U.S. PATENT DOCUMENTS

| | | | |
|---|---|---|---|
| 10,112,648 B2 | 10/2018 | Tamura et al. | |
| 2006/0175113 A1* | 8/2006 | Rodeghiero | B60K 23/0808 180/249 |
| 2009/0125187 A1 | 5/2009 | Yamamoto et al. | |
| 2015/0051794 A1* | 2/2015 | Wei | B62D 15/021 701/41 |
| 2017/0096163 A1* | 4/2017 | Sakaguchi | B62D 6/04 |
| 2020/0130729 A1* | 4/2020 | Lee | B62D 6/00 |

FOREIGN PATENT DOCUMENTS

| | | |
|---|---|---|
| JP | 2003276635 A | 10/2003 |
| JP | 4061980 B2 | 3/2008 |

* cited by examiner

*Primary Examiner* — Jeff A Burke
*Assistant Examiner* — Jerrod Irvin Davis
(74) *Attorney, Agent, or Firm* — HAUPTMAN HAM, LLP

(57) ABSTRACT

A control device includes a processor and a storage device storing a program for controlling an operation of the processor. The processor determines whether a vehicle is in a straight-ahead traveling state, based on a vehicle speed detected by a vehicle speed sensor, a steering wheel torque applied to a steering wheel, and a steering wheel angle as a rotation angle of an input shaft. The processor stores the steering wheel angle in the memory when determining that the vehicle is in the straight-ahead traveling state. The processor stores the steering wheel angle in the memory multiple times when determining that the vehicle is in the straight-ahead traveling state. The processor calculates a corrected steering angle amount from a weighted average of the steering wheel angles stored in the memory.

18 Claims, 7 Drawing Sheets

100 control device
111 power supply circuit
112 angle sensor
113 input circuit
114 communication I/F
115 drive circuit
116 memory
200 processor
300 vehicle speed sensor
541 steering wheel torque sensor
542 steering angle sensor 200 processor
210 straight-ahead traveling determination unit
220 low-pass filter
230 weight determination unit
240 corrected steering angle calculation unit
250 neutral position setting unit

CONTROL DEVICE AND CONTROL METHOD FOR ELECTRIC POWER STEERING APPARATUS, AND MOTOR MODULE

CROSS-REFERENCE TO RELATED APPLICATIONS

The present invention claims priority under 35 U.S.C. § 119 to Japanese Patent Application No. 2020-121934 filed on Jul. 16, 2020, the entire content of which is incorporated herein by reference.

FIELD OF THE INVENTION

The present disclosure relates to a control device and a control method for an electric power steering apparatus, and a motor module.

BACKGROUND

A typical automobile is equipped with an electric power steering apparatus (EPS) including an electric motor (hereinafter, simply referred to as a "motor") and a control device for controlling the motor. The electric power steering apparatus drives the motor to assist a driver's steering wheel operation.

With the recent development of automatic driving technology, it has been required to accurately determine a position of a steering wheel that causes a vehicle to travel straight, in order to achieve stable automatic driving. The position of the steering wheel that causes the vehicle to travel straight is referred to as a neutral position of the steering wheel.

There is a technique of detecting a steering angle at a neutral position. According to the technique, a steering angle at a neutral position is detected from a difference between left and right wheel speeds.

It has been required to more accurately determine a neutral position of a steering wheel.

SUMMARY

A non-limitative and exemplary embodiment of the present disclosure is directed to a control device for controlling a steering system including an input shaft and an output shaft, the control device including a processor, and a storage device storing a program for controlling an operation of the processor, the processor being configured to, in accordance with the program, determine whether a vehicle is in a straight-ahead traveling state, based on a vehicle speed detected by a vehicle speed sensor, a steering wheel torque applied to a steering wheel, and a steering wheel angle as a rotation angle of the input shaft, store the steering wheel angle in the memory when determining that the vehicle is in the straight-ahead traveling state, store the steering wheel angle in the memory multiple times when determining that the vehicle is in the straight-ahead traveling state, and calculate a corrected steering angle amount from a weighted average of the steering wheel angles stored in the memory.

A non-limitative and exemplary embodiment of the present disclosure is directed to a motor module including a motor and the control device described above.

A non-limitative and exemplary embodiment of the present disclosure is directed to a control method for controlling a steering system including an input shaft and an output shaft, the control method including: determining whether a vehicle is in a straight-ahead traveling state, based on a vehicle speed detected by a vehicle speed sensor, a steering wheel torque applied to a steering wheel, and a steering wheel angle as a rotation angle of the input shaft; storing the steering wheel angle in a memory when determining that the vehicle is in the straight-ahead traveling state; storing the steering wheel angle in the memory multiple times when determining that the vehicle is in the straight-ahead traveling state; and calculating a corrected steering angle amount from a weighted average of the steering wheel angles stored in the memory.

The above and other elements, features, steps, characteristics and advantages of the present disclosure will become more apparent from the following detailed description of the preferred embodiments with reference to the attached drawings.

DETAILED DESCRIPTION

Figure 1:
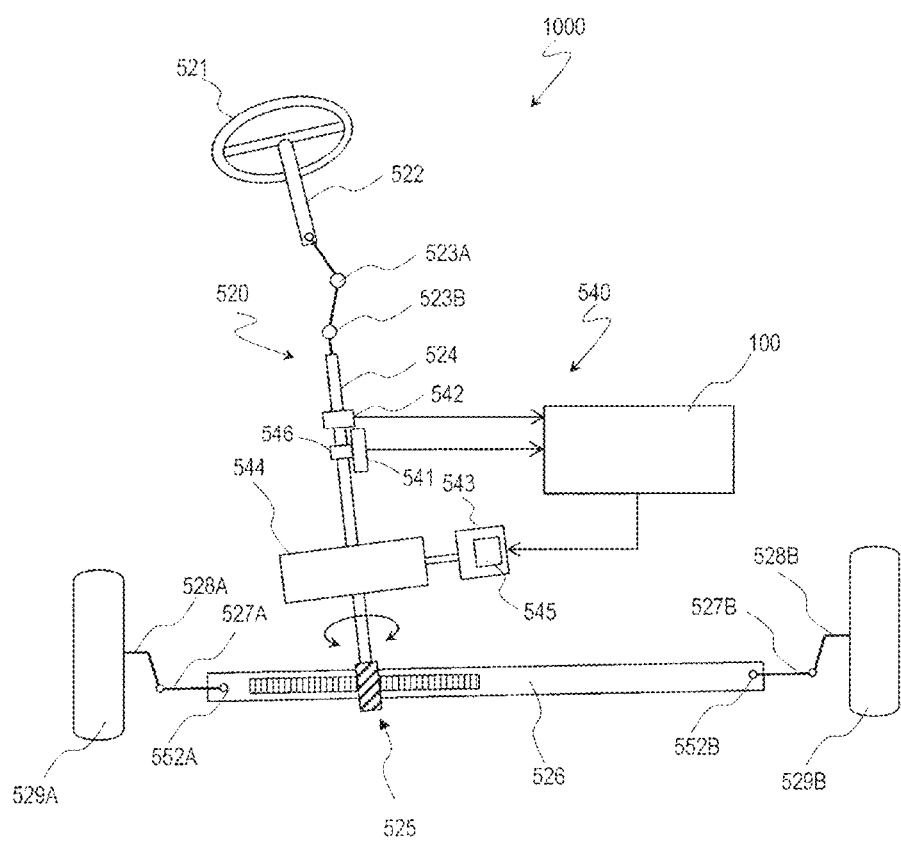
FIG. 1 is a diagram that illustrates an electric power steering apparatus 1000 according to an exemplary embodiment of the present disclosure.

Prior to a description on embodiments of the present disclosure, a description will be given of findings by the inventors.

According to the foregoing technique, while a neutral position can be constantly updated, data upon establishment of a determination condition is regarded as a neutral position; therefore, a position including the vibration of hands owing to a steering feel may erroneously be corrected as a neutral position. A driver does not drive a vehicle at a constant steering wheel angle, but drives the vehicle while slightly turning the steering wheel to the left and right.

Such a steering wheel angle is detected by a sensor. A neutral position of a steering wheel at the time of factory shipment of a vehicle is also referred to as a neutral point of the steering wheel. A control device recognizes a value detected by a sensor when the steering wheel is at the neutral point, as 0 degrees, for example. A factory-shipped vehicle is typically set to travel straight when a steering wheel is at a neutral point. A neutral position refers to a position of the steering wheel that causes the vehicle to travel straight. In the factory-shipped vehicle, the neutral position may be substantially equal to the neutral point of the steering wheel.

However, the neutral position of the steering wheel may be gradually moved due to secular changes in torsion of a torsion bar and mesh of gears in a steering system. In other words, the neutral position of the steering wheel that causes the vehicle to travel straight may gradually deviate from the neutral point.

The inventors of this application have found from the studies made intensively that a neutral position of a steering wheel is determined from a vehicle speed, a steering wheel angle, a steering wheel torque, and a steering speed to find the neutral position more accurately and to allow a vehicle to travel more stably.

According to an embodiment of the present disclosure, a detected neutral position is subjected to weighted average processing in consideration of a slight turn of a steering wheel by a driver and a secular change in a steering system.

According to an embodiment of the present disclosure, the neutral position is corrected more accurately by the weighting according to the vehicle speed in the weighted average processing. Since a vehicle requires the ability to hold a straight line as its vehicle speed is higher, a straight-ahead traveling state is determined more accurately by an increase in weight according to the vehicle speed.

With reference to the accompanying drawings, hereinafter, a specific description will be given of a control device and a control method for an electric power steering apparatus according to an embodiment of the present disclosure as well as an electric power steering apparatus including the control device. However, a specific description more than necessary will not be given in some cases. For example, a specific description on a well-known matter or a duplicate description on a substantially identical configuration will not be given in some cases. This is because of avoiding the following description redundant more than necessary and facilitating the understanding of a person skilled in the art.

Embodiments to be described below are merely exemplary; therefore, a control device and a control method for an electric power steering apparatus according to the present disclosure are not limited to the following embodiments. For example, numerical values, processes, an order of the processes, and the like to be described in the following embodiments are merely exemplary and may be modified variously insofar as there are no technical inconsistencies. The following embodiments are merely exemplary and may be combined variously insofar as there are no technical consistencies.

FIG. 1 is a diagram that schematically illustrates a configuration example of an electric power steering apparatus 1000 according to the present embodiment.

The electric power steering apparatus 1000 (hereinafter, simply referred to as an "EPS") includes a steering system 520 and an auxiliary torque mechanism 540 configured to produce an auxiliary torque. The EPS 1000 produces an auxiliary torque for assisting a steering wheel torque produced from the steering system when a driver turns a steering wheel. The auxiliary torque reduces load on the driver's operation.

The steering system 520 includes, for example, a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right steered wheels 529A and 529B. For example, the steering shaft 522 serves as an input shaft, and the rack shaft 526 serves as an output shaft in the steering system 520.

The auxiliary torque mechanism 540 includes, for example, a steering wheel torque sensor 541, a steering angle sensor 542, an electronic control unit (ECU) 100 for automobiles, a motor 543, a reduction gear 544, an inverter 545, and a torsion bar 546. The steering wheel torque sensor 541 detects torsion of the torsion bar 546, thereby detecting a steering wheel torque in the steering system 520. The steering angle sensor 542 detects a steering angle of the steering wheel. The steering wheel torque may take an estimated value derived from arithmetic processing, rather than a value detected by the steering wheel torque sensor.

The ECU 100 outputs, to the inverter 545, a motor drive signal which the ECU 100 generates based on a detection signal detected by, for example, the steering wheel torque sensor 541, the steering angle sensor 542, or a vehicle speed sensor 300 (FIG. 2) mounted in a vehicle. For example, the inverter 545 supplies, to the motor 543, three-phase alternating-current power having A-phase, B-phase, and C-phase pseudo sine waves into which the inverter 545 converts direct-current power in accordance with a motor drive signal. The motor 543 is, for example, a surface permanent magnet synchronous motor (SPMSM) or a switched reluctance motor (SRM) that receives the three-phase alternating-current power and produces an auxiliary torque according to a steering wheel torque. The motor 543 transmits the auxiliary torque thus produced to the steering system 520 via the reduction gear 544. Hereinafter, the ECU 100 is described as a control device 100 for the EPS.

The control device 100 and the motor 543 are assembled into a module, and a motor module is manufactured and put on the market. The motor module including the motor and the control device 100 is suitably used for the EPS. The control device 100 may alternatively be manufactured and put on the market as a control device for controlling the EPS, independently of the motor.

Figure 2:
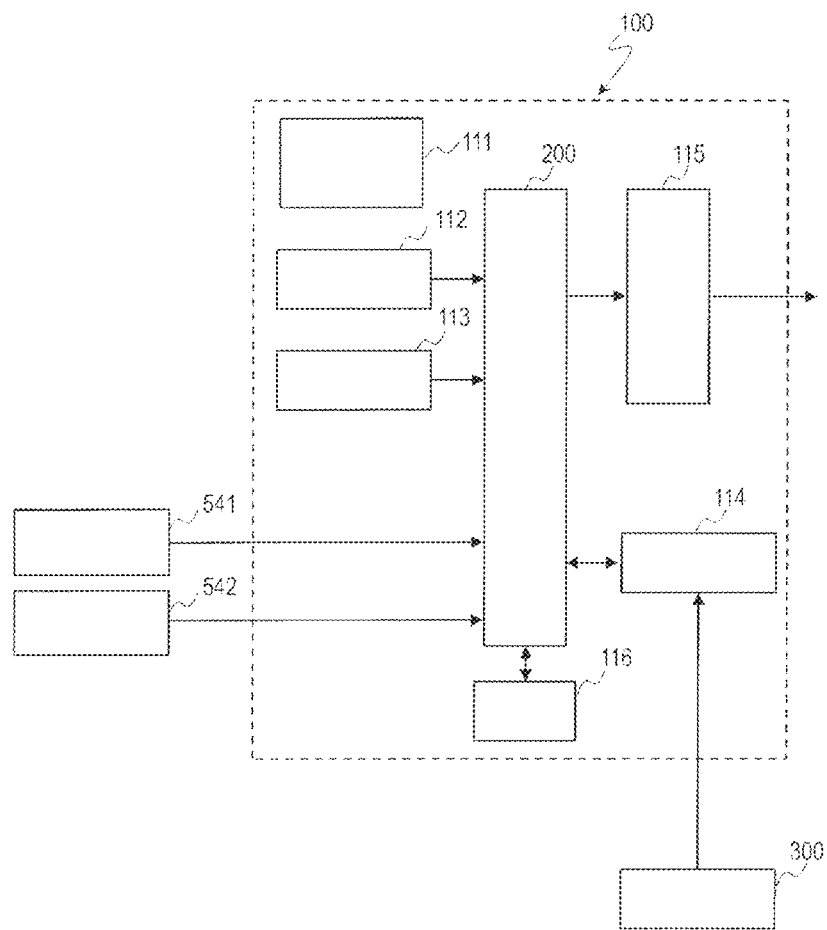
FIG. 2 is a block diagram that illustrates a control device 100 according to an exemplary embodiment of the present disclosure.

FIG. 2 is a block diagram that illustrates a typical example of a configuration of the control device 100 according to the present embodiment. The control device 100 includes, for example, a power supply circuit 111, an angle sensor 112, an input circuit 113, a communication I/F 114, a drive circuit 115, a memory 116, and a processor 200. The control device 100 may be embodied as a printed circuit board (PCB) including these electronic components.

The steering wheel torque sensor 541 is electrically connected to the processor 200 to transmit a steering wheel torque Ts to the processor 200. The steering angle sensor 542 is also electrically connected to the processor 200 to transmit a steering wheel angle θ to the processor 200. The vehicle speed sensor 300 may be disposed at any position on a power transmission path of the vehicle. The vehicle speed sensor 300 transmits a vehicle speed V to the processor 200 by, for example, CAN communication. In the example illustrated in FIG. 2, the vehicle speed sensor 300 transmits the vehicle speed V to the processor 200 via the communication I/F 114.

The control device 100 is electrically connected to the inverter 545 (FIG. 1). The control device 100 controls switching operations of multiple switching elements (e.g., MOSFETs) of the inverter 545. Specifically, the control device 100 outputs, to the inverter 545, a control signal (hereinafter, referred to as a "gate control signal") for controlling the switching operation of each switching element.

The control device 100 generates a torque command value based on a vehicle speed V, a steering wheel torque Ts, and the like, and controls a torque and a rotational speed of the motor 543 by, for example, vector control. The control device 100 may perform any closed loop control in addition to the vector control. The rotational speed is represented by a number of revolutions of a rotor per unit time (e.g., one minute) (rpm) or a number of revolutions of a rotor per unit time (e.g., one second) (rps). The vector control is a method of decomposing a current flowing through the motor into a current component that contributes to torque production and a current component that contributes to magnetic flux generation, and independently controlling the current components that are orthogonal to each other.

The power supply circuit 111 is connected to an external power source (not illustrated) to generate a DC voltage to be supplied to each block in the circuitry. The DC voltage to be generated is, for example, 3 V or 5 V.

The angle sensor 112 is, for example, a resolver or a Hall IC. The angle sensor 112 may alternatively be a combination of a magnetoresistive (MR) sensor including MR elements with a sensor magnet. The angle sensor 112 detects a rotation angle of the rotor in the motor 543, and outputs the rotation angle to the processor 200. The control device 100 may include, in place of the angle sensor 112, a speed sensor configured to detect a rotational speed of the motor or an acceleration sensor configured to detect an acceleration of the motor.

The input circuit 113 receives a motor current value (hereinafter, referred to as an "actual current value") detected by a current sensor (not illustrated), converts a level of the actual current value to an input level of the processor 200 as required, and outputs the actual current value to the processor 200. The input circuit 113 is typically, for example, an analog-to-digital conversion circuit.

The processor 200 is a semiconductor integrated circuit, and is also referred to as a central processing unit (CPU) or a microprocessor. The processor 200 implements desired processes by sequentially executing computer programs that are stored in the memory 116 and describe commands for controlling the driven motor. The processor 200 is broadly interpreted as terminology including a CPU-equipped field programmable gate array (FPGA), application specific integrated circuit (ASIC) or application specific standard product (ASSP). The processor 200 sets a target current value in accordance with, for example, the actual current value and the rotation angle of the rotor to generate a PWM signal, and outputs the PWM signal to the drive circuit 115.

The communication I/F 114 is, for example, an input/output interface for data exchange that conforms to an onboard control area network (CAN).

The drive circuit 115 is typically a gate driver (or a pre-driver). The drive circuit 115 generates a gate control signal in accordance with the PWM signal, and gives the gate control signal to a gate of each switching element in the inverter 545. In a case where a target to be driven is a motor that is driven at low voltage, the gate driver is not necessarily required. In this case, the processor 200 may have the function of the gate driver.

The memory 116 is an example of a storage device, and is electrically connected to the processor 200. The memory 116 is, for example, a writable memory (e.g., a PROM), a rewritable memory (e.g., a flash memory, an EEPROM), or a read-only memory. The memory 116 stores therein a control program including a command set that causes the processor 200 to drive the motor. For example, the control program is once developed onto a RAM (not illustrated) at a boot time.

Figure 3:
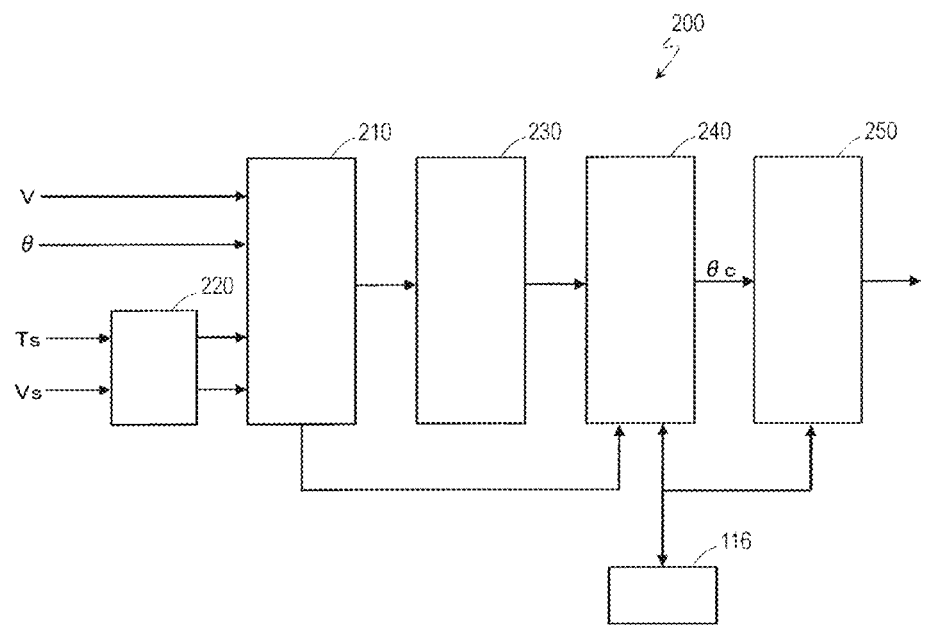
FIG. 3 is a functional block diagram that illustrates, on a functional block basis, functions mounted on a processor 200 according to an exemplary embodiment of the present disclosure, for accurately determining a neutral position of a steering wheel 521.

FIG. 3 is a functional block diagram that illustrates, on a functional block basis, functions mounted on the processor 200, for accurately determining a neutral position of the steering wheel. According to an exemplary embodiment of the present disclosure, the processor 200 includes, as functional blocks, a straight-ahead traveling determination unit 210, a low-pass filter 220, a weight determination unit 230, a corrected steering angle calculation unit 240, and a neutral position setting unit 250. Typically, the processes (or the tasks) of the functional blocks corresponding to the respective units are described in the computer program on a software module basis, and are stored in the memory 116. However, in a case where an FPGA or the like is used, all or some of the functional blocks may be implemented as hardware accelerators.

In a case where each functional block is mounted as software (or firmware) on the control device 100, the processor 200 may execute the software. According to an embodiment of the present disclosure, the control device 100 includes the processor 200 and the memory 116 storing the program for controlling the operation of the processor 200. In accordance with the program, (1) the processor 200 determines whether the vehicle is in a straight-ahead traveling state, based on a vehicle speed V detected by the vehicle speed sensor 300, a steering wheel torque Ts applied to the steering wheel 521, and a steering wheel angle θ as a rotation angle of the input shaft, (2) the processor 200 stores the steering wheel angle θ in the memory 116 when determining that the vehicle is in the straight-ahead traveling state, (3) the processor 200 stores the steering wheel angle θ in the memory 116 multiple times when determining that the vehicle is in the straight-ahead traveling state, and (4) the processor 200 calculates a corrected steering angle amount θc from a weighted average of the steering wheel angles θ stored in the memory 116.

As illustrated in FIG. 3, the processor 200 receives the vehicle speed V from the vehicle speed sensor 300, receives the steering wheel torque Ts from the steering wheel torque sensor 541, and receives the steering wheel angle θ from the steering angle sensor 542. The processor 200 calculates, based on the steering wheel angle θ, a steering speed Vs that represents changes in rotation angle of the steering wheel 521 and steering shaft 522 per unit time.

The straight-ahead traveling determination unit 210 of the processor 200 receives the vehicle speed V and the steering wheel angle θ. Each of the steering wheel torque Ts and the steering speed Vs is processed by the low-pass filter 220, and then is input to the straight-ahead traveling determination unit 210. The use of the low-pass filter 220 enables removal of high-frequency noise from a signal of each of the steering wheel torque Ts and the steering speed Vs.

The straight-ahead traveling determination unit 210 determines whether the vehicle is in the straight-ahead traveling state, based on the vehicle speed V, the steering wheel torque Ts, the steering speed Vs, and the steering wheel angle θ. In the present embodiment, for example, the processor 200 determines whether the vehicle is in the straight-ahead traveling state, by appropriately using a first straight-ahead traveling determination condition and a second straight-ahead traveling determination condition to be described below.

The first straight-ahead traveling determination condition includes the following relationships:

the vehicle speed V≥a threshold value that is set based on a parameter [km/h];

the steering wheel torque Ts≤a threshold value that changes in accordance with a vehicle speed [Nm];

the steering speed Vs≤the threshold value that changes in accordance with the vehicle speed [deg/s]; and the steering wheel angle θ≤the threshold value that changes in accordance with the vehicle speed [deg].

The second straight-ahead traveling determination condition includes the following relationships:

the vehicle speed V≥the threshold value that is set based on the parameter [km/h];

the steering wheel torque Ts≤the threshold value that changes in accordance with the vehicle speed [Nm];

the steering speed Vs≤the threshold value that changes in accordance with the vehicle speed [deg/s]; and the steering wheel angle θ≤the threshold value that is set based on the parameter [deg].

The threshold value of the vehicle speed V is, for example, but not limited to, equal to or more than 40 km/h.

Figure 4:
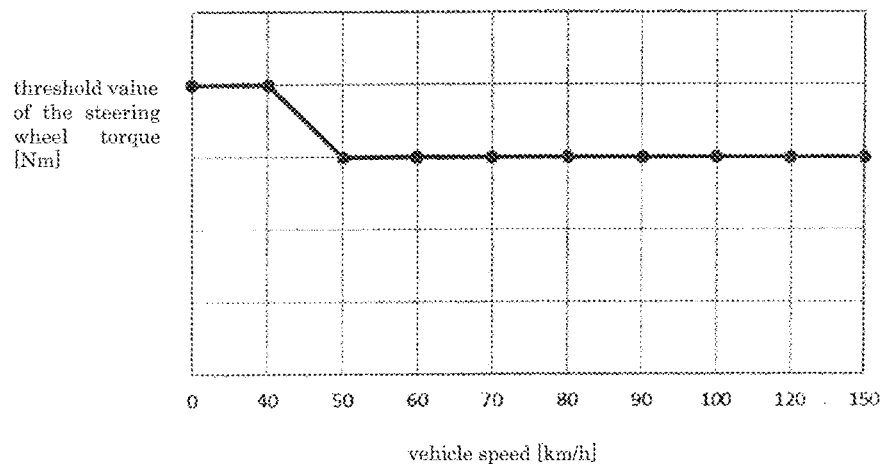
FIG. 4 is a graph that illustrates an example of a threshold value of a steering wheel torque Ts according to an exemplary embodiment of the present disclosure.

FIG. 4 is a graph that illustrates an example of the threshold value of the steering wheel torque Ts. In the graph of FIG. 4, the vertical axis indicates the threshold value [Nm] of the steering wheel torque Ts, and the horizontal axis indicates the vehicle speed V [km/h]. As illustrated in FIG. 4, the threshold value of the steering wheel torque Ts is smaller as the vehicle speed V is higher. When the steering wheel torque Ts is equal to or less than the threshold value, the straight-ahead traveling determination unit 210 determines that the steering wheel torque Ts satisfies the first and second straight-ahead traveling determination conditions.

Figure 5:
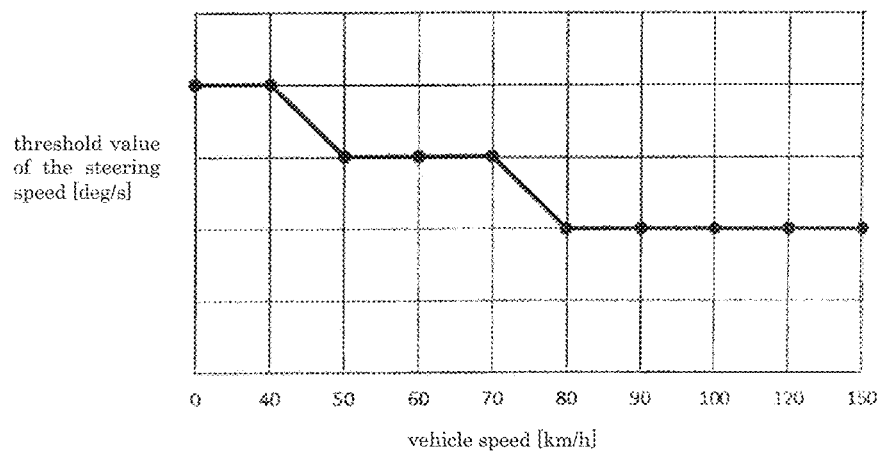
FIG. 5 is a graph that illustrates an example of a threshold value of a steering speed Vs according to an exemplary embodiment of the present disclosure.

FIG. 5 is a graph that illustrates an example of the threshold value of the steering speed Vs. In the graph of FIG. 5, the vertical axis indicates the threshold value [deg/s] of the steering speed Vs, and the horizontal axis indicates the vehicle speed V [km/h]. As illustrated in FIG. 5, the threshold value of the steering wheel torque Ts is smaller as the vehicle speed V is higher. When the steering speed Vs is equal to or less than the threshold value, the straight-ahead traveling determination unit 210 determines that the steering speed Vs satisfies the first and second straight-ahead traveling determination conditions.

The threshold value of the steering wheel angle θ is a variable value that is changeable in accordance with the vehicle speed V on the first straight-ahead traveling determination condition, and is set based on the parameter on the second straight-ahead traveling determination condition. The threshold value of the steering wheel angle θ on the second straight-ahead traveling determination condition may alternatively be a fixed value.

On the second straight-ahead traveling determination condition, the threshold value of the steering wheel angle θ is set at, for example, but not limited to, 3 degrees. In a case where the threshold value is 3 degrees, the straight-ahead traveling determination unit 210 determines that the steering wheel angle θ satisfies the second straight-ahead traveling determination condition when the steering wheel angle θ is equal to or less than 3 degrees.

Figure 6:
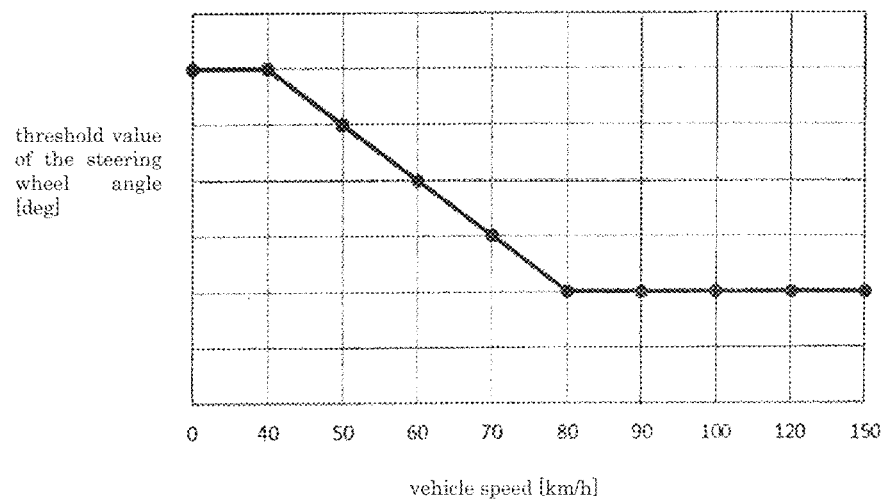
FIG. 6 is a graph that illustrates an example of a threshold value of a steering wheel angle θ on a first straight-ahead traveling determination condition according to an exemplary embodiment of the present disclosure.

FIG. 6 is a graph that illustrates an example of the threshold value of the steering wheel angle θ on the first straight-ahead traveling determination condition. In the graph of FIG. 6, the vertical axis indicates the threshold value [deg] of the steering wheel angle θ, and the horizontal axis indicates the vehicle speed V [km/h]. As illustrated in FIG. 6, the threshold value of the steering wheel angle θ is smaller as the vehicle speed V is higher. When the steering wheel angle θ is equal to or less than the threshold value, the straight-ahead traveling determination unit 210 determines that the steering wheel angle θ satisfies the first straight-ahead traveling determination condition.

The steering wheel angle θ to be compared with the threshold value may take a value of a steering wheel angle on the assumption that a steering wheel angle of the steering wheel 521 at a currently set neutral position is 0 degrees. Depending on the degree of a secular change in the vehicle, a value of raw data on the steering angle sensor 542 at the currently set neutral position may be already approximate to the threshold value or may exceed the threshold value. In such a case, a comparison between the threshold value and the value of the steering wheel angle on the assumption that the steering wheel angle at the currently set neutral position is 0 degrees enables an accurate straight-ahead traveling determination.

Figure 7:
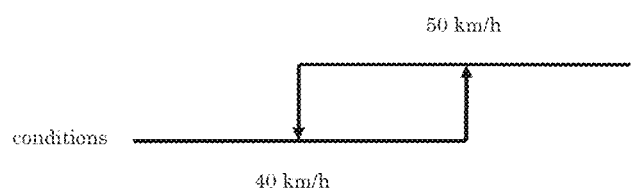
FIG. 7 is a diagram that illustrates an example of a hysteresis set for a threshold value of a vehicle speed V according to an exemplary embodiment of the present disclosure.

In the present embodiment, the vehicle speed V may take a variable threshold value. A hysteresis is set for the threshold value of the vehicle speed V. FIG. 7 is a diagram that illustrates an example of the hysteresis set for the threshold value of the vehicle speed V. It is assumed in the example illustrated in FIG. 7 that a condition "vehicle speed V threshold value" is satisfied when the vehicle speed V becomes equal to or more than 50 km/h by the acceleration of the vehicle. In this case, it is not determined that the condition "vehicle speed V threshold value" is not established when the vehicle speed V becomes less than 50 km/h by the deceleration of the vehicle, but it is determined that the condition "vehicle speed V≥threshold value" is not established when the vehicle speed V becomes less than 40 km/h by the deceleration. Setting the hysteresis for the vehicle speed V enables suppression of chattering near the threshold value of the vehicle speed V. Specifically, setting the hysteresis enables suppression of occurrence of a situation in which a straight-ahead traveling determination and a non-straight-ahead traveling determination are switched frequently in a case where a slight change in vehicle speed V is repeated such that the value exceeds and falls below the threshold value of the vehicle speed V.

In the present embodiment, for example, the straight-ahead traveling determination unit 210 determines whether the second straight-ahead traveling determination condition is entirely satisfied. When determining that second straight-ahead traveling determination condition is entirely satisfied, the straight-ahead traveling determination unit 210 then determines whether the first straight-ahead traveling determination condition is entirely satisfied.

When determining that the first straight-ahead traveling determination condition is entirely satisfied, the straight-ahead traveling determination unit 210 then determines whether the satisfied state is continued for a certain duration. The certain duration is, for example, but not limited to, 200 ms. When determining that the satisfied state is continued for the certain duration, the straight-ahead traveling determination unit 210 determines that the vehicle is in the straight-ahead traveling state. When determining that the satisfied state is not continued for the certain duration, the straight-ahead traveling determination unit 210 determines that the vehicle is not in the straight-ahead traveling state.

When determining that the first straight-ahead traveling determination condition is not entirely satisfied, but the second straight-ahead traveling determination condition is entirely satisfied, the straight-ahead traveling determination unit 210 determines whether the state in which the second straight-ahead traveling determination condition is entirely satisfied is continued for a certain duration. When determining that the satisfied state is continued for the certain duration, the straight-ahead traveling determination unit 210 determines that the vehicle is in the straight-ahead traveling state. When determining that the satisfied state is not continued for the certain duration, the straight-ahead traveling determination unit 210 determines that the vehicle is not in the straight-ahead traveling state.

In the present embodiment, when determining that the first straight-ahead traveling determination condition or the second straight-ahead traveling determination condition is entirely satisfied, the straight-ahead traveling determination unit 210 determines whether the satisfied state is continued for the certain duration. When determining that the satisfied state is continued for the certain duration, the straight-ahead traveling determination unit 210 determines that the vehicle is in the straight-ahead traveling state. The straight-ahead traveling determination unit 210 does not determine the instantaneous establishment of the straight-ahead traveling state as the straight-ahead traveling state. This configuration therefore improves straight-ahead traveling determination accuracy.

In addition, the threshold value of the steering wheel angle $\theta$ on the first straight-ahead traveling determination condition is smaller as the vehicle speed V is higher. Setting the threshold value of the steering wheel angle $\theta$ smaller as the vehicle speed V is higher enables reduction in determination that the vehicle travels straight although the vehicle rounds a curve when the driver slightly turns the steering wheel 521 of the vehicle traveling at high speed than when the driver turns the steering wheel 521 of the vehicle traveling at low speed.

In addition, the threshold value of the steering wheel angle $\theta$ on the first straight-ahead traveling determination condition may take a maximum value that is smaller than the threshold value of the steering wheel angle $\theta$ on the second straight-ahead traveling determination condition. In other words, the threshold value of the steering wheel angle $\theta$ on the second straight-ahead traveling determination condition may be larger than the maximum value of the threshold value of the steering wheel angle $\theta$ on the first straight-ahead traveling determination condition. On the second straight-ahead traveling determination condition, the straight-ahead traveling determination is made using the loosened threshold value. This configuration further facilitates the calculation of the corrected steering angle amount $\theta c$.

As described above, the straight-ahead traveling determination unit 210 determines that the vehicle is in the straight-ahead traveling state when determining that the state in which the first straight-ahead traveling determination condition is entirely satisfied is continued for the certain duration. In this case, the straight-ahead traveling determination unit 210 outputs, to the weight determination unit 230, data indicating the determination that the vehicle is in the straight-ahead traveling state on the first straight-ahead traveling determination condition. The straight-ahead traveling determination unit 210 also outputs, to the corrected steering angle calculation unit 240, an instantaneous value of the steering wheel angle $\theta$ in the certain duration.

The straight-ahead traveling determination unit 210 determines that the vehicle is in the straight-ahead traveling state when determining that the state in which the second straight-ahead traveling determination condition is entirely satisfied is continued for the certain duration. In this case, the straight-ahead traveling determination unit 210 outputs, to the weight determination unit 230, data indicating the determination that the vehicle is in the straight-ahead traveling state on the second straight-ahead traveling determination condition. The straight-ahead traveling determination unit 210 also outputs, to the corrected steering angle calculation unit 240, an instantaneous value of the steering wheel angle $\theta$ in the certain duration.

When the straight-ahead traveling determination unit 210 determines that the vehicle is in the straight-ahead traveling state on the first straight-ahead traveling determination condition, the weight determination unit 230 outputs a weight coefficient W1 to the corrected steering angle calculation unit 240. When the straight-ahead traveling determination unit 210 determines that the vehicle is in the straight-ahead traveling state on the second straight-ahead traveling determination condition, the weight determination unit 230 outputs a weight coefficient W2 to the corrected steering angle calculation unit 240. The weight coefficient W1 is larger in value than the weight coefficient W2. For example, the weight coefficient W1 takes, but not limited to, a value of 5.0, and the weight coefficient W2 takes, but not limited to, a value of 0.5.

When the straight-ahead traveling determination unit 210 determines that the vehicle is in the straight-ahead traveling state on the first straight-ahead traveling determination condition, the corrected steering angle calculation unit 240 stores, in the memory 116, data indicating that the weight coefficient W1 is applied to the instantaneous value of the steering wheel angle $\theta$ in the certain duration. When the straight-ahead traveling determination unit 210 determines that the vehicle is in the straight-ahead traveling state on the second straight-ahead traveling determination condition, the corrected steering angle calculation unit 240 stores, in the memory 116, steering wheel angle data indicating that the weight coefficient W2 is applied to the instantaneous value of the steering wheel angle $\theta$ in the certain duration.

The processor 200 repeatedly executes the process of determining whether the vehicle is in the straight-ahead traveling state. Each time the straight-ahead traveling determination unit 210 determines that the vehicle is in the straight-ahead traveling state on the first straight-ahead traveling determination condition, the corrected steering angle calculation unit 240 stores, in the memory 116, the steering wheel angle data indicating that the weight coefficient W1 is applied to the instantaneous value of the steering wheel angle $\theta$ in the certain duration. Each time the straight-ahead traveling determination unit 210 determines that the vehicle is in the straight-ahead traveling state on the second straight-ahead traveling determination condition, the corrected steering angle calculation unit 240 stores, in the memory 116, the steering wheel angle data indicating that the weight coefficient W2 is applied to the instantaneous value of the steering wheel angle $\theta$ in the certain duration. The processor 200 repeatedly executes the process until the corrected steering angle calculation unit 240 stores the steering wheel angle data indicating that the weight coefficient is applied to the instantaneous value of the steering wheel angle $\theta$, in the memory 116 predetermined times. The predetermined times are, for example, but not limited to, 50 times.

Each time the straight-ahead traveling determination unit 210 determines that the vehicle is in the straight-ahead traveling state, the corrected steering angle calculation unit 240 reads, from the memory 116, the steering wheel angle data stored last 50 times. The corrected steering angle calculation unit 240 calculates a corrected steering angle amount θc from a weighted average of the steering wheel angle data stored last 50 times.

In a case where the steering wheel angle data is stored in the memory 116 less than 50 times from the startup of the vehicle, the corrected steering angle calculation unit 240 may obtain the weighted average by reading, from the memory 116, steering wheel angle data stored in the memory 116 before the startup of the vehicle. In the present embodiment, the memory 116 is a nonvolatile memory that holds the steering wheel angle data even after the power-off of the vehicle.

Since the first straight-ahead traveling determination condition is severer than the second straight-ahead traveling determination condition, the straight-ahead traveling determination that satisfies the first straight-ahead traveling determination condition is higher in reliability than the straight-ahead traveling determination that satisfies the second straight-ahead traveling determination condition. Setting the value of the weight coefficient W1 larger than the value of the weight coefficient W2 enables increase in reliability of the corrected steering angle amount θc.

The corrected steering angle calculation unit 240 outputs the corrected steering angle amount θc thus calculated to the neutral position setting unit 250. The memory 116 stores therein data on the currently set neutral position of the steering wheel 521. The corrected steering angle amount θc represents a shift amount (an angle) between the currently set neutral position of the steering wheel 521 and the neutral position of the steering wheel 521 obtained based on the straight-ahead traveling determination. The neutral position setting unit 250 sets, for example, the position (the steering wheel angle θ) of the steering wheel 521 corresponding to the corrected steering angle amount θc for the neutral position of the steering wheel 521. The data on the neutral position of the steering wheel 521 is thus updated. The corrected steering angle amount θc corresponds to the weighted average of the steering wheel angle data, and derives the neutral position at which the weighted average of the steering wheel angles upon establishment of the straight-ahead traveling determination condition is updated. For example, the neutral position setting unit 250 may add the corrected steering angle amount θc as a correction value to the currently set neutral position of the steering wheel 521 to update the neutral position of the steering wheel 521. It is assumed that, for example, a right turning direction of the steering wheel 521 is defined as a positive direction, and a left turning direction of the steering wheel 521 is defined as a negative direction. In a case where a position of the steering wheel 521 turned right from the currently set neutral position of the steering wheel 521 is a neutral position to be updated, the corrected steering angle amount θc takes a positive value. In a case where a position of the steering wheel 521 turned left from the currently set neutral position of the steering wheel 521 is a neutral position to be updated, the corrected steering angle amount θc takes a negative value.

The weight coefficients W1 and W2 may become larger as the vehicle speed V is higher. A self-aligning torque tends to increase as the vehicle speed V is higher. Increasing the weight coefficient applied to the steering wheel angle θ at the high vehicle speed V enables further improvement in reliability of the corrected neutral position.

A plurality of straight-ahead traveling determination conditions may appropriately be used for a determination as to whether the vehicle is in the straight-ahead traveling state, in accordance with the vehicle speed V. In this case, the value of the weight coefficient to be used in the case where the straight-ahead traveling determination condition at the high vehicle speed V is satisfied is set larger than the value of the weight coefficient to be used in the case where the straight-ahead traveling determination condition at the low vehicle speed V is satisfied. Increasing the weight coefficient to be used in the case where the straight-ahead traveling determination condition at the high vehicle speed V is satisfied enables further improvement in reliability of the corrected neutral position.

In a case where the steering wheel angle data is stored in the memory 116 less than the predetermined times from the startup of the vehicle, the straight-ahead traveling determination unit 210 may use the steering wheel angle data stored in the memory 116 before the startup of the vehicle, for the calculation of the corrected steering angle amount θc. In the present embodiment, the memory 116 is a nonvolatile memory that continuously holds the steering wheel angle data even after the power-off of the vehicle. The steering wheel angle data for the straight-ahead traveling determination is not sufficiently accumulated immediately after startup of the vehicle, for example, immediately after an ignition switch is turned on. Even immediately after the startup of the vehicle, the neutral position of the steering wheel 521 is determined by reading, from the memory 116, the steering wheel angle data that makes up for a shortage, and the neutral position is accurately determined at an early stage at the time when the vehicle shifts to a traveling state.

Next, a description will be given of a straight-ahead traveling determination using an integrated value of the steering wheel torque Ts.

Figure 8:
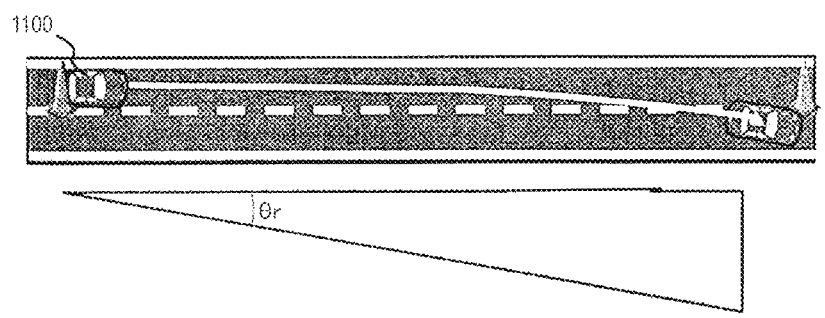
FIG. 8 is a diagram that illustrates a vehicle 1100 rounding a large-radius curve in accordance with an exemplary embodiment of the present disclosure.

FIG. 8 is a diagram that illustrates a vehicle 1100 rounding a large-radius curve. In FIG. 8, θr is, for example, 2.3 degrees. When the steering wheel angle θ is fixed at a small angle such that the vehicle 1100 rounds a large-radius curve, the neutral position may be corrected in the foregoing processes. In view of this, the steering wheel torque Ts is integrated, and the steering wheel angle θ in a case where a certain load is continuously applied to the steering wheel 521 is not used for the calculation of the corrected steering angle amount θc. For example, the weight coefficient is set at zero.

Figure 9:
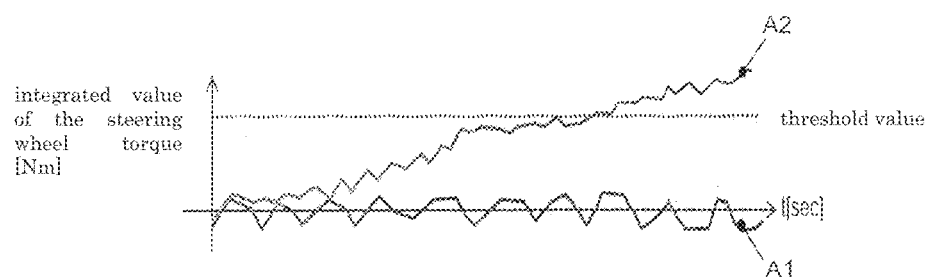
FIG. 9 is a graph that illustrates an example of an integrated value of the steering wheel torque Ts according to an exemplary embodiment of the present disclosure.

FIG. 9 is a graph that illustrates an example of an integrated value of the steering wheel torque Ts. In FIG. 9, the vertical axis indicates the integrated value of the steering wheel torque Ts, and the horizontal axis indicates a time. An integrated value A1 indicates an integrated value of the steering wheel torque Ts at the time when the vehicle travels straight. An integrated value A2 indicates an integrated value of the steering wheel torque Ts at the time when the vehicle rounds a curve. A broken line indicates a threshold value.

The processor 200 integrates the steering wheel torque Ts when determining that the vehicle is in the straight-ahead traveling state. It can be said that the vehicle rounds a curve in a case where the integrated value of the steering wheel torque Ts is equal to or more than the threshold value. When the integrated value is equal to or more than the threshold value, the processor 200 does not calculate the corrected steering angle amount θc, based on the steering wheel angle data stored in the memory 116 after the processor 200 has started to determine this time that the vehicle is in the straight-ahead traveling state. For example, the processor 200 updates, to zero, the weight coefficient of the steering wheel angle data stored in the memory 116 after the processor 200 has started to determine this time that the vehicle is in the straight-ahead traveling state. With this configuration, the processor 200 does not calculate the corrected steering angle amount θc, based on the steering wheel angle data.

This configuration thus enables accurate detection of the straight-ahead traveling state even under a condition that the vehicle rounds a large-radius curve. When the vehicle rounds a large-radius curve, the steering wheel torque Ts is biased to one side. The processor 200 does not calculate the corrected steering angle amount θc, based on the steering wheel angle data in the case where the integrated value of the steering wheel torque Ts is equal to or more than the threshold value. This configuration thus suppresses erroneous calculation of the corrected steering angle amount θc.

Figure 10:
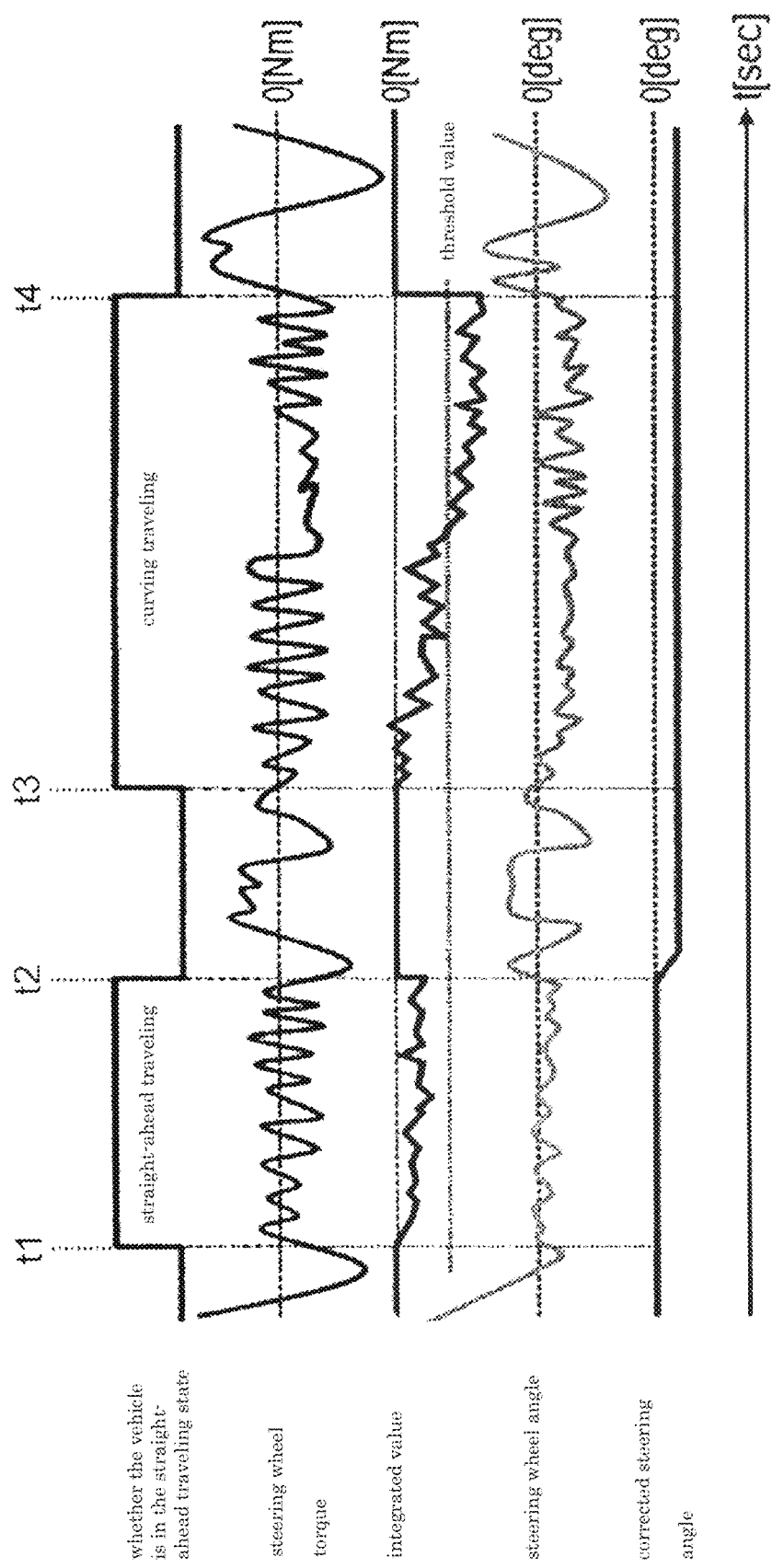
FIG. 10 is a graph that illustrates an example of processing using the integrated value of the steering wheel torque Ts according to an exemplary embodiment of the present disclosure.

FIG. 10 is a graph that illustrates an example of processing using the integrated value of the steering wheel torque Ts. In FIG. 10, a period from a time t1 to a time t2 indicates a period from a start of a determination that the vehicle is in the straight-ahead traveling state to a determination that the vehicle is not in the straight-ahead traveling state. In the period from the time t1 to the time t2, the integrated value of the steering wheel torque Ts is less than the threshold value. Therefore, the processor 200 calculates the corrected steering angle amount θc, based on the steering wheel angle data stored in this period.

In FIG. 10, a period from a time t3 to a time t4 indicates another period from the start of the determination that the vehicle is in the straight-ahead traveling state to the determination that the vehicle is not in the straight-ahead traveling state. In the period from the time t3 to the time t4, the integrated value of the steering wheel torque Ts is equal to or more than the threshold value. Therefore, the processor 200 does not calculate the corrected steering angle amount θc, based on the steering wheel angle data stored in this period. The corrected steering angle amount θc calculated last time is maintained as it is. This configuration suppresses updating of a neutral position using the steering wheel angle data stored at the time when the vehicle rounds a curve.

In the foregoing embodiment, the processor 200 determines whether the vehicle is in the straight-ahead traveling state, from the vehicle speed V, the steering wheel torque Ts, the steering wheel angle θ, and the steering speed Vs; however, the present disclosure is not limited thereto. For example, the processor 200 may determine whether the vehicle is in the straight-ahead traveling state, from the vehicle speed V, the steering wheel torque Ts, and the steering wheel angle θ excluding the steering speed Vs. This configuration also enables an accurate determination as to whether the vehicle is in the straight-ahead traveling state. The processor 200 determines that the vehicle is in the straight-ahead traveling state, from the steering speed Vs in a case where each of the steering wheel torque Ts and the steering wheel angle θ is less than the threshold value, for example, in a case where the steering wheel 521 slowly returns to the neutral position. As described above, when the determination as to whether the vehicle is in the straight-ahead traveling state is made based on the steering speed Vs, the straight-ahead traveling determination and the calculation of the corrected steering angle amount are made more accurately.

In the foregoing embodiment, the memory 116 storing the program for controlling the operation of the processor 200 is the same as the memory 116 storing the steering wheel angle θ in the case where it is determined that the vehicle is in the straight-ahead traveling state; however, these memories may be different from each other.

Embodiments of the present disclosure may be applicable to, for example, a control device for controlling an electric power steering apparatus mounted in a vehicle.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device for controlling a steering system including an input shaft and an output shaft,
the control device comprising:
   a processor; and
   a memory storing a program for controlling an operation of the processor,
the processor being configured to, in accordance with the program,
   determine whether a vehicle is in a straight-ahead traveling state, based on a vehicle speed detected by a vehicle speed sensor, a steering wheel torque applied to a steering wheel, and a steering wheel angle as a rotation angle of the input shaft,
   store the steering wheel angle in the memory multiple times in response to determining that the vehicle is in the straight-ahead traveling state,
   calculate a corrected steering angle amount from a weighted average of the steering wheel angles stored in the memory, and
   set a position of the steering wheel corresponding to the corrected steering angle amount as a neutral position of the steering wheel that causes the vehicle to travel in the straight-ahead traveling state,
wherein
the memory comprises a nonvolatile memory, and
in response to the number of steering wheel angles stored in the memory after startup of the vehicle being less than a predetermined number, the processor is configured to use data on the steering wheel angle stored in the memory before the startup of the vehicle, to calculate the corrected steering angle amount.

2. The control device according to claim 1, wherein
the processor is configured to
   determine whether a state in which each of the vehicle speed, the steering wheel torque, and the steering wheel angle satisfies a predetermined condition is continued for a certain duration,
   determine that the vehicle is in the straight-ahead traveling state in response to determining that the state is continued for the certain duration, and
   determine that the vehicle is not in the straight-ahead traveling state in response to determining that the state is not continued for the certain duration.

3. The control device according to claim 2, wherein
the processor is configured to determine that the steering wheel angle satisfies the predetermined condition in response to the steering wheel angle is equal to or less than a fourth threshold value,
the processor is configured to determine whether the vehicle is in the straight-ahead traveling state based on one of a first straight-ahead traveling determination condition and a second straight-ahead traveling determination condition, the fourth threshold value is a variable value that changes in accordance with the vehicle speed, on the first straight-ahead traveling determination condition, the fourth threshold value is a fixed value on the second straight-ahead traveling determination condition, the processor is configured to calculate the corrected steering angle amount from a weight coefficient, and the weight coefficient to be used in a case where the first straight-ahead traveling determination condition is satisfied is larger in value than the weight coefficient to be used in a case where the second straight-ahead traveling determination condition is satisfied.

4. The control device according to claim 3, wherein
the fourth threshold value on the first straight-ahead traveling determination condition becomes smaller as the vehicle speed becomes higher.

5. The control device according to claim 3, wherein
the fourth threshold value that is the variable value on the first straight-ahead traveling determination condition has a maximum value smaller than the fourth threshold value that is the fixed value on the second straight-ahead traveling determination condition.

6. The control device according to claim 1, wherein
the processor is configured to determine whether the vehicle is in the straight-ahead traveling state, based on a steering speed indicating a change in rotation angle of the input shaft per unit time.

7. The control device according to claim 6, wherein
the processor is configured to
determine whether a state in which each of the vehicle speed, the steering wheel torque, the steering wheel angle, and the steering speed satisfies a predetermined condition is continued for a certain duration,
determine that the vehicle is in the straight-ahead traveling state in response to determining that the state is continued for the certain duration, and
determine that the vehicle is not in the straight-ahead traveling state in response to determining that the state is not continued for the certain duration.

8. The control device according to claim 7, wherein
the processor is configured to determine that the vehicle speed satisfies the predetermined condition in response to the vehicle speed being equal to or more than a first threshold value,
the first threshold value is variable, and
a hysteresis is set for the first threshold value.

9. The control device according to claim 7, wherein
the processor is configured to determine that the steering wheel torque satisfies the predetermined condition in response to the steering wheel torque being equal to or less than a second threshold value,
the processor is configured to determine that the steering speed satisfies the predetermined condition in response to the steering speed being equal to or less than a third threshold value, and
each of the second threshold value and the third threshold value becomes lower as the vehicle speed becomes higher.

10. The control device according to claim 6, wherein
the processor is configured to process each of the steering wheel torque and the steering speed by a low-pass filter, and
the processor is configured to determine whether the vehicle is in the straight-ahead traveling state based on the steering wheel torque and the steering speed each processed by the low-pass filter.

11. The control device according to claim 1, wherein
the processor is configured to calculate the corrected steering angle amount from a weight coefficient, and
the weight coefficient has a value that becomes larger as the vehicle speed becomes higher.

12. The control device according to claim 1, wherein
the processor is configured to determine whether the vehicle is in the straight-ahead traveling state based on one of a plurality of straight-ahead traveling determination conditions selected in accordance with the vehicle speed,
the processor is configured to calculate the corrected steering angle amount from a weight coefficient, and
the weight coefficient to be used in a case where the straight-ahead traveling determination condition at a high vehicle speed is satisfied is larger in value than the weight coefficient to be used in a case where the straight-ahead traveling determination condition at a low vehicle speed lower than the high vehicle speed is satisfied.

13. The control device according to claim 1, wherein
the processor is configured to integrate the steering wheel torque in response to determining that the vehicle is in the straight-ahead traveling state, and
in response to an integrated value of the steering wheel torque being equal to or more than a fifth threshold value, the processor is configured to not calculate the corrected steering angle amount, using the steering wheel angle stored in the memory after determining that the vehicle is in the straight-ahead traveling state.

14. The control device according to claim 1, wherein
the processor is configured to integrate the steering wheel torque in response to determining that the vehicle is in the straight-ahead traveling state, and
in response to an integrated value of the steering wheel torque being equal to or more than a fifth threshold value, the processor is configured to set zero for a weight coefficient to be used for the steering wheel angle stored in the memory after determining that the vehicle is in the straight-ahead traveling state.

15. The control device according to claim 1, wherein
the memory stores the neutral position of the steering wheel, and
the processor is configured to add the corrected steering angle amount as a correction value to the neutral position of the steering wheel stored in the memory, to update the neutral position of the steering wheel.

16. A motor module comprising:
a motor; and
the control device according to claim 1.

17. A control device for controlling a steering system including an input shaft and an output shaft,
the control device comprising:
a processor; and
a memory storing a program for controlling an operation of the processor,
the processor being configured to, in accordance with the program,
determine whether a vehicle is in a straight-ahead traveling state, based on a vehicle speed detected by a vehicle speed sensor, a steering wheel torque applied to a steering wheel, and a steering wheel angle as a rotation angle of the input shaft,
store the steering wheel angle in the memory multiple times in response to determining that the vehicle is in the straight-ahead traveling state, calculate a corrected steering angle amount from a weighted average of the steering wheel angles stored in the memory, and set a position of the steering wheel corresponding to the corrected steering angle amount as a neutral position of the steering wheel that causes the vehicle to travel in the straight-ahead traveling state, wherein the processor is configured to determine whether the vehicle is in the straight-ahead traveling state, based on a steering speed indicating a change in rotation angle of the input shaft per unit time, the processor is configured to determine whether a state in which each of the vehicle speed, the steering wheel torque, the steering wheel angle, and the steering speed satisfies a predetermined condition is continued for a certain duration, determine that the vehicle is in the straight-ahead traveling state when determining that the state is continued for the certain duration, and determine that the vehicle is not in the straight-ahead traveling state when determining that the state is not continued for the certain duration, the processor is configured to determine that the vehicle speed satisfies the predetermined condition when the vehicle speed is equal to or more than a first threshold value, the first threshold value is variable, and a hysteresis is set for the first threshold value.

18. A control device for controlling a steering system including an input shaft and an output shaft, the control device comprising:

a processor; and a memory storing a program for controlling an operation of the processor, the processor being configured to, in accordance with the program, determine whether a vehicle is in a straight-ahead traveling state, based on a vehicle speed detected by a vehicle speed sensor, a steering wheel torque applied to a steering wheel, and a steering wheel angle as a rotation angle of the input shaft, store the steering wheel angle in the memory multiple times in response to determining that the vehicle is in the straight-ahead traveling state, calculate a corrected steering angle amount from a weighted average of the steering wheel angles stored in the memory, and set a position of the steering wheel corresponding to the corrected steering angle amount as a neutral position of the steering wheel that causes the vehicle to travel in the straight-ahead traveling state, wherein the processor is configured to integrate the steering wheel torque when determining that the vehicle is in the straight-ahead traveling state, and when an integrated value of the steering wheel torque is equal to or more than a fifth threshold value, the processor is configured to not calculate the corrected steering angle amount, using the steering wheel angle stored in the memory after determining the vehicle being in the straight-ahead traveling state.

* * * * *